United States Patent [19]

Branford

[11] Patent Number: 5,030,098

[45] Date of Patent: Jul. 9, 1991

[54] VIBRATORY DENTAL MOUTHPIECE

[76] Inventor: William G. Branford, 1233 Laurelhurst, Eugene, Oreg. 97402

[21] Appl. No.: 400,008

[22] Filed: Aug. 29, 1989

[51] Int. Cl.[5] .......... A61C 5/00

[52] U.S. Cl. .......... 433/215; 433/229; 128/32

[58] Field of Search .......... 433/6, 71, 215, 229; 272/94, 95; 128/25 R, 32

[56] References Cited

U.S. PATENT DOCUMENTS

| | | | |
|---|---|---|---|
| 1,826,434 | 10/1931 | Riess | 128/32 |
| 1,851,865 | 3/1932 | Ptacek | 272/95 |
| 1,953,088 | 4/1934 | Purdy | 272/95 |
| 2,055,924 | 9/1936 | Chappell | 128/32 |
| 2,258,857 | 10/1941 | McCann | 128/32 |
| 3,057,348 | 10/1962 | Baer | 128/32 |
| 3,115,139 | 12/1963 | Schneider | 128/32 X |
| 4,348,178 | 9/1982 | Kurz | 433/6 |
| 4,472,140 | 9/1984 | Lustig | 433/71 X |
| 4,624,640 | 11/1986 | Tesini | 433/71 |
| 4,744,556 | 5/1988 | Shaffer | 272/95 X |
| 4,883,046 | 11/1989 | Fontenot | 433/215 X |

*Primary Examiner*—Robert P. Swiatek
*Assistant Examiner*—Nicholas D. Lucchesi
*Attorney, Agent, or Firm*—James D. Givnan, Jr.

[57] ABSTRACT

A malleable plate is provided with a cover of resilient cushioning material for insertion between the user's upper and lower teeth. The plate may be of a perforate nature with an extension for securement to a base adapted for attachment to a hand held vibrator. The plate is deformed by the user's bite to effect positive securement to the teeth.

4 Claims, 1 Drawing Sheet

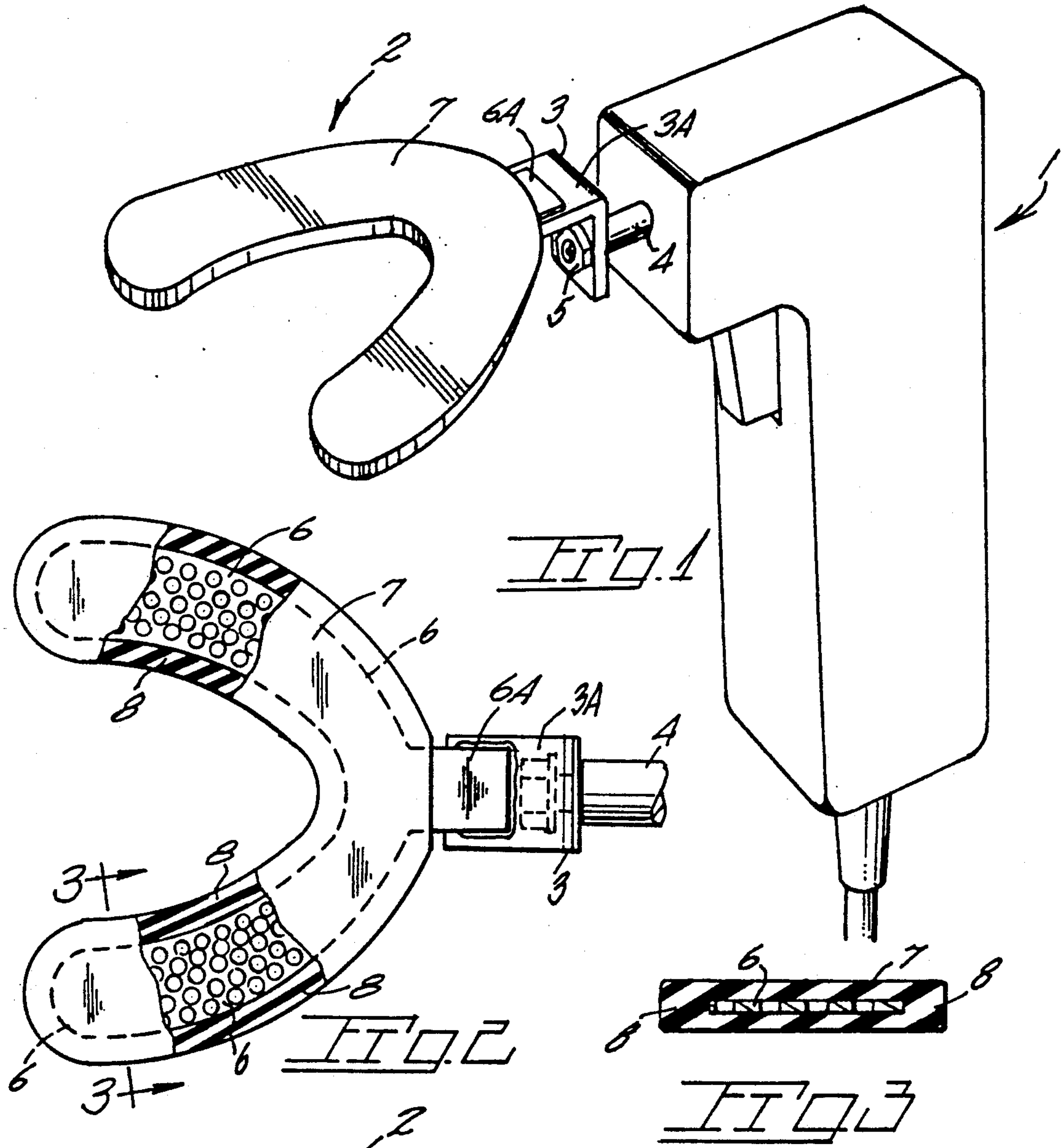
FIG. 1
FIG. 2
FIG. 3
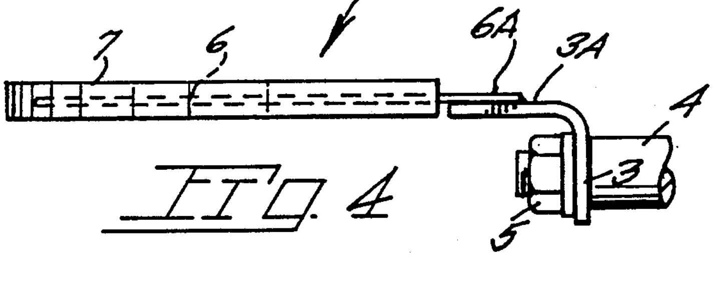
FIG. 4
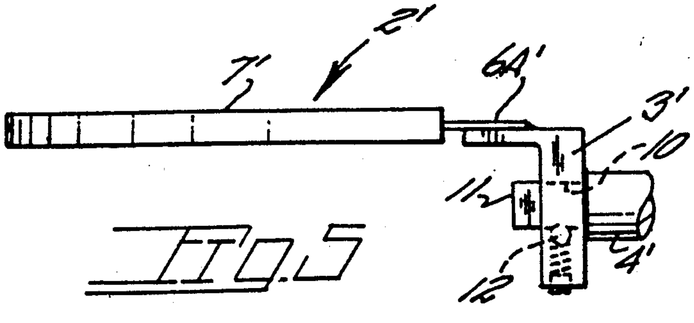
FIG. 5

VIBRATORY DENTAL MOUTHPIECE

BACKGROUND OF THE INVENTION

The present invention pertains generally to prophylactic dental devices.

The occurrence of pyorrhea appears to be increasing amongst the populace of the United States and other highly developed countries. A suspected cause of the increase in pyorrhea is the reduction of meat in the diet to avoid cholesterol in the blood. While the reduction of the amount of meat consumed by the public may have beneficial results in this regard, the teeth become more susceptible to pyorrhea by reason of the absence of loads imparted to the teeth during the chewing of meat. Not unusual is the loss of teeth by middle aged persons due to pyorrhea which could be avoided, to a large extent, by exercising of the teeth in a manner simulating chewing.

In the prior art are various devices generally intended to enable exercising of the teeth by subjecting same to loads or forces resulting from a biting action or horizontally directed loads applied from an external, mechanical source. U.S. Pat. No. 4,185,817 discloses a device of monolithic pliant construction which permits exercising of the teeth by a biting action. The device in U.S. Pat. Nos. 1,586,499 and 1,953,088 permit exercising of the teeth by the application of horizontally directed forces to a resilient mouthpiece.

SUMMARY OF THE PRESENT INVENTION

The present invention is embodied within a mouthpiece of a pliant nature for exercising of the peridontal membranes of a user's teeth to prevent pyorrhea.

The mouthpiece includes upper and lower resilient members with malleable deformable plate means therebetween. Biting of the mouthpiece results in the plate means adapting to the user's bite which, of course, will vary with each user. A vibrator imparts motion to the mouthpiece and the user's teeth in a positive manner without lost motion. During use of the mouthpiece, the peridontal membrane of each tooth is subjected to vibratory motion which simulates loads imparted thereto during chewing. In societies where the consumption of foods requiring chewing is high there is virtually no pyorrhea.

Objectives of the present invention include the provision of a mouthpiece adapted for attachment to a hand held vibrator which effectively transmits forces from the vibrator to each of the user's teeth for prophylactic purposes; the provision of a mouthpiece for use with a vibrat which adapts to a wide range of mouth sizes and shapes and; the provision of a mouthpiece attachable to a vibrator shaft in an interchangeable manner.

BRIEF DESCRIPTION OF THE DRAWINGS

In the accompanying drawings:

FIG. 1 is an upper perspective view of the present invention;

FIG. 2 is a plan view of the mouthpiece;

FIG. 3 is a vertical sectional view taken along line 3—3 of FIG. 2; and FIG. 4 is a side elevational view of FIG. 2; and FIG. 5 is a view similar to FIG. 4 and showing a modified form of mouthpiece.

DETAILED DESCRIPTION OF THE PREFERRED EMBODIMENTS

With continuing attention to the drawings wherein applied reference numerals indicate parts similarly hereinafter identified, the reference numeral 1 indicates generally a hand held vibrator.

The present mouthpiece generally at 2 is supported by a base 3 apertured for attachment to a vibrator output shaft 4 as by a lock washer and nut 5. Base 3 includes a horizontal arm portion at 3A.

Plate means at 6 includes ear 6A carried by base 3. Plate means 6 is of U-shape for placement between and gripped by the user's upper and lower rows of teeth. Plate means 6 is of malleable light gauge sheet material, as for example, 1/32 inch brass sheet. Plate deformation occurs in response to tooth exerted forces to contribute to positive engagement of the mouthpiece with the teeth. The plate is preferably perforate to enhance its malleable nature and adherence to a later described resilient exterior member.

For the purpose of providing a cushion for the user's teeth, a resilient exterior member at 7 is applied to the plate means which may be applied, for example, as a resilient coating of a suitable elastomer or applied by formation on the plate means using a suitable adhesive. The teeth are accordingly prevented from coming into contact with the plate means. A perimetrical wall 8 of the resilient exterior member assures isolation of the teeth.

Use of the present mouthpiece is by clamping of the mouthpiece between the teeth. The imparting of vibratory forces to the teeth and hence the periodontal membrane of each tooth for a minute or so each day stimulates the membrane which is advantageous in the prevention of pyorrhea. The vibrator may be of the common type sold for massage purposes.

In FIG. 5 I show a modified mouthpiece wherein a base at 3′ has a rectangular aperture 10 to receive a stud 11 on a motor output shaft at 4′ which is of like section. A spring biased ball at 12 serves to latch the base 3′ on stud 11 against accidental loss during use.

While I have shown but a few embodiments of the invention, it will be apparent to those skilled in the art that the invention may be embodied still otherwise without departing from the spirit and scope of the invention.

Having thus described the invention, what is claimed is:

1. In combination, a vibrator of the hand held type having an output shaft, a mouthpiece for clenching between a user's teeth and for attachment to the hand held vibrator, said mouthpiece comprising, a base adapted for engagement with said vibrator output shaft, a single plate of malleable perforate construction capable of deforming in response to biting pressure so as to retain an impression of the user's teeth having a series of openings carried by said base for placement intermediate a user's upper and lower rows of teeth, a resilient coating adhering to said plate to isolate the user's teeth from contact with said plate, and said plate when vibrated imparting loads to the teeth for therapeutic purposes.

2. The combination claimed in claim 1 wherein said plate is of a malleable sheet metal for at least partial shaping by a biting action of the user's teeth.

3. The combination claimed in claim 1 wherein said output shaft includes a stud of rectangular section, said base defining a rectangular aperture, a spring biased lock element on said base for engagement with said stud.

4. The combination claimed in claim 1 wherein said output shaft terminates in a stud of polygonal section, said base defining an aperture of like section for engagement with said stud, a spring biased lock acting on said stud and base.

* * * * *